United States Patent [19]

Havira

[11] Patent Number: 4,733,380

[45] Date of Patent: Mar. 22, 1988

[54] APPARATUS AND METHOD FOR ACOUSTICALLY INVESTIGATING A CASING SET IN A BOREHOLE

[75] Inventor: R. Mark Havira, New Fairfield, Conn.

[73] Assignee: Schlumberger Technology Corporation, Ridgefield, Conn.

[21] Appl. No.: 686,123

[22] Filed: Dec. 26, 1984

[51] Int. Cl.$^4$ .............................................. G01V 1/40
[52] U.S. Cl. ..................... 367/35; 367/151; 181/105; 73/151
[58] Field of Search ............... 367/35, 155, 157, 151; 181/105; 73/625, 151; 310/334, 335, 367, 369; 364/422

[56] References Cited

U.S. PATENT DOCUMENTS

| | | |
|---|---|---|
| 2,848,891 | 8/1958 | Hunter et al. . |
| 3,086,195 | 4/1963 | Halliday . |
| 3,166,731 | 1/1965 | Joy . |
| 3,177,382 | 4/1965 | Green . |
| 3,243,768 | 3/1966 | Roshon, Jr. et al. ............... 367/157 |
| 3,741,334 | 6/1973 | Kaule . |
| 3,845,333 | 10/1977 | Holloway . |
| 3,914,987 | 10/1975 | Bickel . |
| 4,022,055 | 5/1977 | Flournoy et al. . |
| 4,255,798 | 3/1981 | Havira . |
| 4,271,490 | 6/1981 | Minohara et al. . |
| 4,281,550 | 8/1981 | Erikson . |
| 4,305,296 | 12/1981 | Green et al. . |
| 4,307,613 | 12/1981 | Fox . |
| 4,344,159 | 8/1982 | Ballinger . |
| 4,381,470 | 4/1983 | Leach et al. . |
| 4,382,290 | 5/1983 | Havira ..................... 367/35 |
| 4,383,446 | 5/1983 | Roeder et al. . |
| 4,384,231 | 5/1983 | Ishikawa et al. . |
| 4,385,255 | 5/1983 | Yamaguchi et al. . |
| 4,412,315 | 10/1983 | Flournoy . |
| 4,425,525 | 1/1984 | Smith et al. . |
| 4,587,641 | 5/1986 | Di Foggio ..................... 367/35 |

*Primary Examiner*—Thomas H. Tarcza
*Assistant Examiner*—Daniel T. Pihulic
*Attorney, Agent, or Firm*—St.Onge Steward Johnston & Reens

[57] ABSTRACT

A method and apparatus for acoustically investigating a casing in a borehole are described. An electronically scannable acoustic transducer is formed on a planar circular surface and is oriented on a tool so as to direct circumferentially scannable beams of acoustic energy initially in an axial direction and subsequently in a radial direction onto the casing. Acoustic reflections from casing wall segments are detected and the frequencies of the casing reverberations present in the reflections are measured. One frequency measuring technique employs a reiterative technique whereby a previously measured frequency of a reflection attributable to one wall segment is used to generate a subsequent pulsed acoustic beam at the same wall segment. The number of reiterations may vary and is selected to accurately determine the thickness resonance of the casing. The scanning speed of the array and the number of transducers are selected so that the casing segments onto which the beams are incident circumferentially overlap.

11 Claims, 9 Drawing Figures

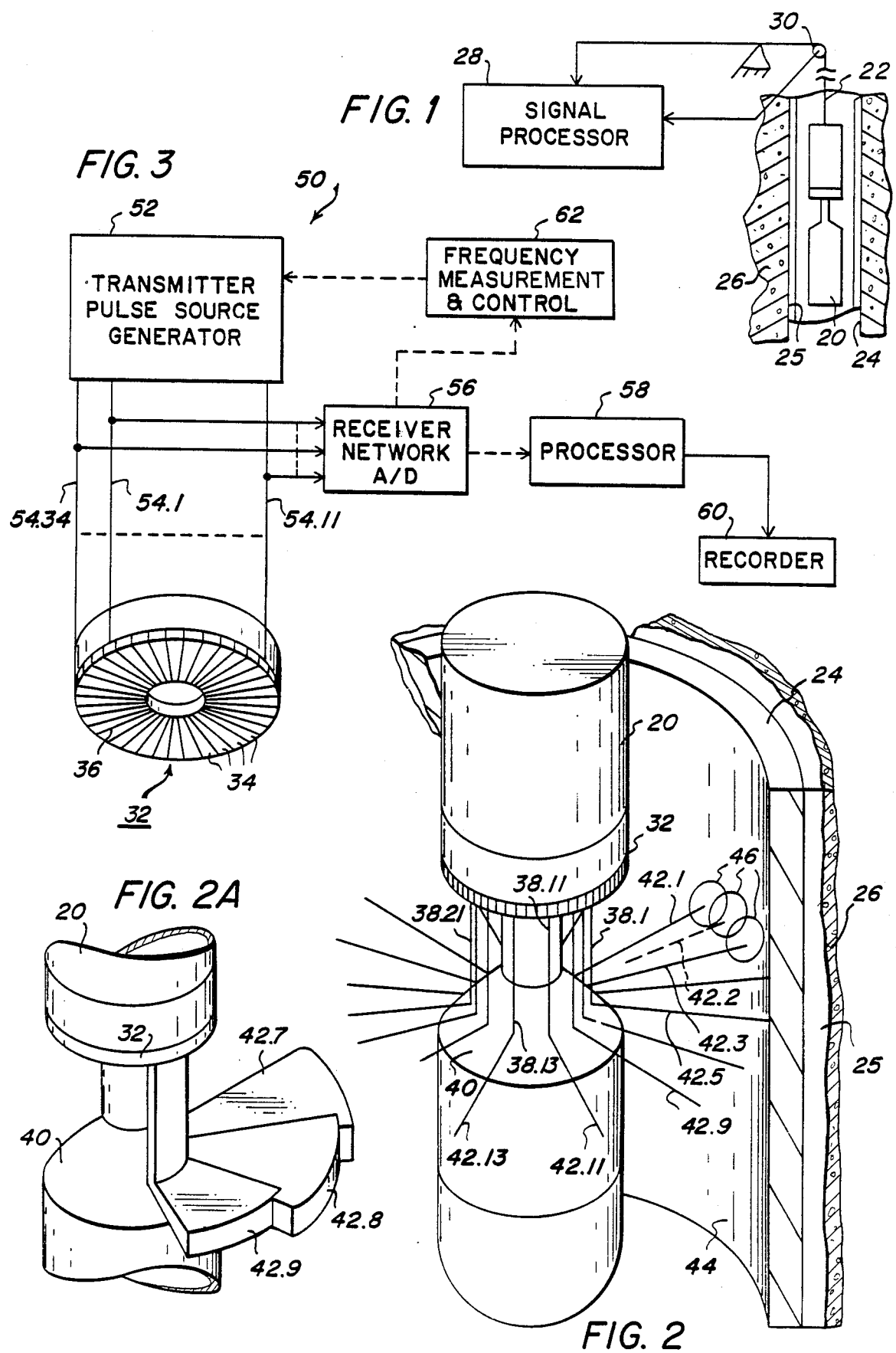

APPARATUS AND METHOD FOR ACOUSTICALLY INVESTIGATING A CASING SET IN A BOREHOLE

FIELD OF THE INVENTION

This invention generally relates to an apparatus and method for acoustically investigating the wall of a cased borehole penetrating an earth formation. More specifically, this invention relates to a method and apparatus for acoustically measuring the thickness of substantially an entire borehole casing.

BACKGROUND OF THE INVENTION

Acoustic pulse echo techniques for investigating a casing set in a borehole are known in the art. In one technique as shown in U.S. Pat. No. 4,255,789 to Havira, a plurality of acoustic transducers are mounted around a tool to each direct acoustic energy at the wall of a borehole and detect acoustic reflections. The transducers are radially mounted to transmit and receive energy in a radial direction. Although this technique is particularly effective for evaluating certain characteristics such as the cement bond behind the casing or its thickness, the investigation with such spaced transducers does not yield information on the entire wall. A technique could be employed to use a mechanical scanning arrangement as shown in this patent. However, mechanical rotational components are preferably avoided in a hostile environment such as a mud-filled borehole.

Another pulse-echo technique for testing the wall thickness of a casing is described in U.S. Pat. Nos. 4,022,055 and 4,412,315. These describe a plurality of acoustic transducers that are arranged in a circle around the axis of a tool. The transducers are oriented to direct the acoustic pulses in an axial direction, i.e., a direction that is parallel to the axis of the tool. Acoustic energy is incident upon a conical reflecting surface which reflects each pulse towards the casing. The reflecting surface is split into two separate conical surfaces that are axially off-set from each other. The conical reflecting surfaces may be concave, convex or straight. A split reflection surface as described is not considered by this inventor to be useful for investigating a borehole casing with an acoustic pulse echo technique.

Ultrasonic transducers have been employed in an array. For example in the U.S. patents to Green, U.S. Pat. No. 3,177,382 and to Holloway U.S. Pat. No. 3,845,333 segments of transducers are shown arranged to radiate acoustic energy in radial directions. A linear array of transducers is shown in U.S. Pat. No. 4,425,525 and a planar array is shown in U.S. Pat. No. 4,344,159. A curved array of transducers arranged on an arc of a circle is described in U.S. Pat. No. 4,281,550. The latter array radiates and receives acoustic energy that travels in the direction of the center of the arc. A planar array of transducer segments is shown in U.S. Pat. No. 4,307,613 with groups of segments being so excited as to approximate the shape of a particular element. An array of transducers with selective phase shifting is described in U.S. Pat. No. 4,271,490. A technique for ultrasonic testing for flaws by focusing acoustic energy from successive transmitter groups is described in U.S. Pat. No. 3,693,415.

Techniques have been described for acoustically determining the thickness of an object by determining the thickness resonance frequency of the object. One technique as described in U.S. Pat. Nos. 3,741,334 and 3,914,987 involves directing an acoustic pulse at the object with a pulse whose frequency is initially set at the normal thickness resonance frequency of the object. The acoustic reverberations in the object are then detected and amplified for use in making another measurement of the thickness resonance. This procedure may be repeated until the frequency of reverberations accurately represent the thickness of the object.

It is desirable to detect defective areas in a casing that is set in a borehole to identify corroded areas to thus be able to take corrective steps to avoid blow-outs and contamination of and by water bearing zones. The casing thicknesses indicative of such defects may vary from a nominal value and it is, therefore, desirable to measure the casing thickness in an accurate manner.

SUMMARY OF THE INVENTION

With a method and apparatus in accordance with the invention the entire circumference of the wall of a cased borehole can be acoustically investigated and, thus, the entire wall of the borehole examined for defects as an acoustic investigating tool is moved along the borehole.

This is obtained by generating, from stationary sources that are closely spaced in an annular array, pulsed beams of acoustic energy. These pulsed beams travel in a direction that is initially generally parallel to the axis of the tool. Each beam is then reflected by a continuous annular conical surface in a radial direction towards the borehole wall. The beams are so circumferentially spaced that circumferentially adjacent beams are incident upon borehole wall segments that circumferentially overlap. In this manner, the entire circumference of the borehole wall can be acoustically investigated. The thickness of the entire casing as well as defects such as caused by corrosion can be detected and the annular array of acoustic transducers is preferably concentrically positioned on the tool with respect to the tool axis. The array has an active planar surface that is oriented perpendicular to the tool axis so that each transducer transmits and then detects acoustic energy traveling parallel to the tool axis. The continuous annular conical reflection surface is sufficiently spaced from the array to enable the detection of casing reflections without interference by a trailing portion of the transmitted pulse.

The array of transducers has a disk shape with the transducers closely spaced with active surfaces arranged on the flat surface of the disk. A plurality of transducers may be activated generally at the same time to produce circumferentially separated and isolated beams. Scanning with a number of these separated isolated beams may thus speed up the investigation of the entire casing wall.

Each acoustic beam may be formed by activating a number of nearby transducers to provide specially focused beams as well as supply more energy. The focusing and scanning are done electronically without mechanical movements of components. With a technique in accordance with the invention a single tool can be employed with differently sized casings.

It is, therefore, an object of the invention to provide a method and apparatus for acoustically investigating the entire wall of a cased borehole without the use of mechanically moving parts. It is a further object of the invention to provide a method and apparatus for acoustically measuring the thickness of the entire wall of a casing set in a borehole.

BRIEF DESCRIPTION OF DRAWINGS

FIG. 1 is a schematic diagram of a tool employing an apparatus for acoustically investigating a borehole in accordance with the invention;

FIG. 2 is a partial perspective view of the tool of FIG. 1 inside a casing in a borehole;

FIG. 2A is a partial perspective of a tool such as shown in FIG. 2 generating overlapping ultrasonic beams;

FIG. 3 is a block diagram of an apparatus for acoustically investigating the wall of a borehole in accordance with the invention;

FIG. 4 is a schematic diagram of a network for use with the apparatus of FIG. 3;

DETAILED DESCRIPTION OF THE DRAWINGS

Figure 5:
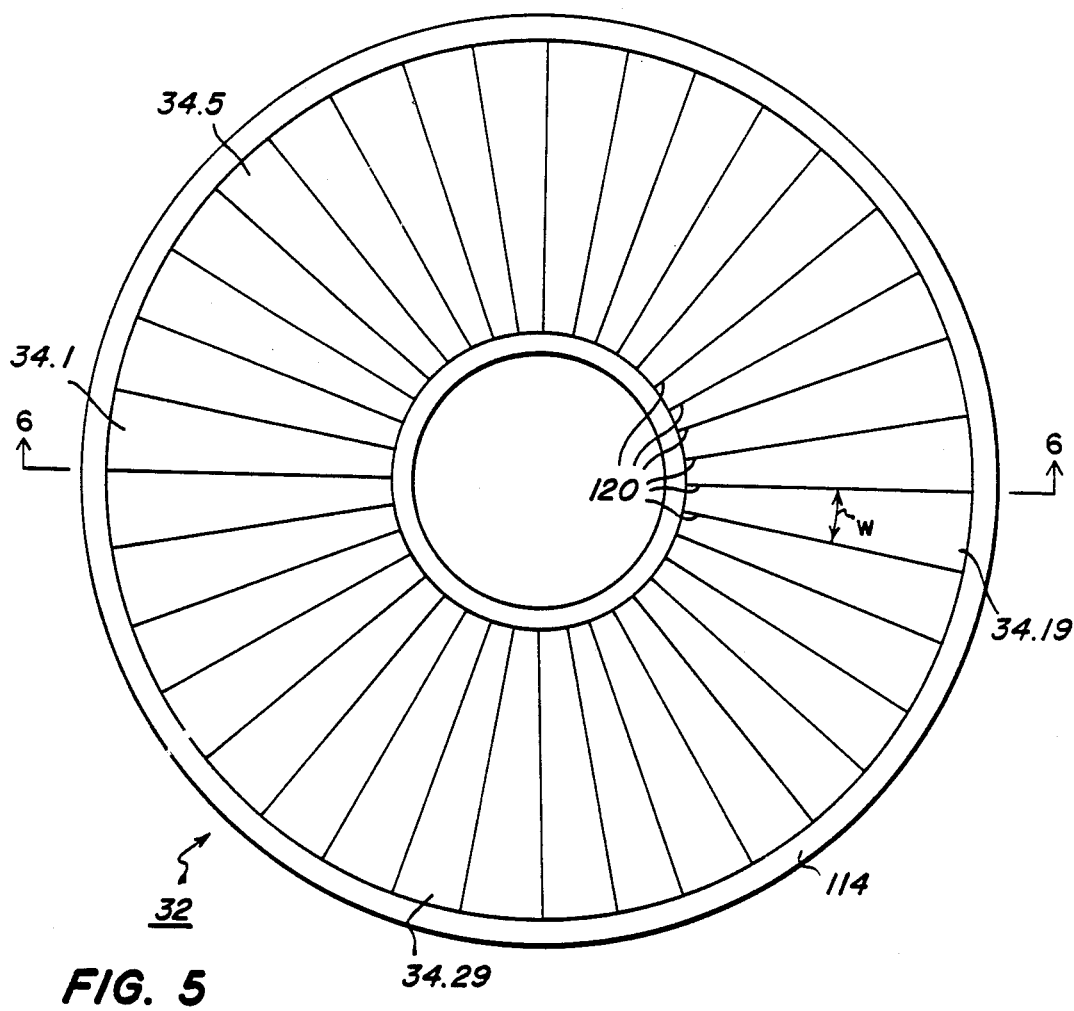
FIG. 5 is a bottom plan view of a transducer array used in the apparatus of FIG. 3.

With reference to FIGS. 1-3, an acoustic investigation tool 20 is shown suspended from a cable 22 inside a casing 24 set in a borehole 25 penetrating an earth formation 26. The cable is connected to a precessor 28 located on the surface where a depth sensor 30 is also located to determine the depth of tool 20 in borehole 24.

Tool 20 has an acoustic transducer array 32 (see FIGS. 2 and 3) which is formed of a plurality of transducers 34 that are closely spaced adjacent each other as can be seen in FIGS. 3 and 5. In this embodiment, thirty six transducers 34 are shown in array 32 in the form of a disk. The array 32 has a flat active surface 36 which is oriented to direct acoustic energy from the transducers 34 generally parallel to the tool axis as shown with lines 38 in FIG. 2.

A continuous annular conical reflection surface 40 is interposed in the path of acoustic pulses from transducers 34 to reflect the beams along radial paths as suggested by lines 42 for generally normal incidence with the inner surface 44 of casing 24.

The transducers 34 can be operated to each produce separate pulsed acoustic beams, as suggested by the separate beams 42 and which circumferentially overlap as shown in FIG. 2A to become incident on separate casing wall segments such as 46. The transducers 34 are so spaced and selected in size that adjacent wall segments 46 circumferentially overlap. The scanning speed with which the beams are generated around the circumference relative to the direction of motion of the tool along the borehole is selected sufficiently high so that axially adjacent wall segments 46 also overlap. As a result the entire casing surface 44 can be acoustically investigated, while the resolution of the investigation is high, for example, with wall segments whose sizes are sufficiently small so as to detect casing flaws whose dimensions are less than a half inch.

FIG. 3 shows an operation and control system 50 with which the transducers 34 are energized and the acoustic reflections detected by them processed. A transmitter pulse generator 52 generates electrical pulses on lines 54.1-54.36 leading to transducers 34. The pulses have a duration, shape and frequency content as are well known in the art to energize transducers 34 for the measurement of the thickness of the casing 24. The lines 54 are also coupled to a receiver network 56 where electrical signals representative of acoustic reflections are converted to digital signals. A processor 58 is used to analyze the acoustic reflections such as generating signals representative of the thickness of the casing 24 at wall segments 46 or representative of the quality of the bond between the cement layer 25 and casing 24. The analysis may be stored on a recorder 60 which can be a magnetic medium and a visual record.

One advantageous aspect of the invention is that the speed of scanning with the pulsed acoustic beams from transducers 34 can be high. This then permits an iterative process by which the frequency content of the acoustic returns can be measured in a network 62 and then used to adjust the frequency of the transmitter pulse used to energize the same transducer 34 once again. This can be done a number of times until the frequency stabilizes. In practice, a single reiteration may suffice to arrive at a precise resonance frequency representative of the thickness of the casing at a particular segment 46.

When the speed of scanning of the circumference is to be increased, because the tool speed along the borehole is high or the number of iterations employed to precisely measure the casing thickness is high, the transmitter pulse source 52 may actuate several widely spaced transducers 34 at one time. In such case, for example, those transducers are energized that will produce pulsed acoustic beams that are circumferentially isolated so as to avoid interference with each other. Thus, several non-interfering pulsed beams such as 42.1, 42.10, 42.19, 42.28 are generated at generally the same time, but at circumferentially spaced regions, for example, at spacings separated by about ninety (90°) or more.

Generation of a beam 42 may involve one or several adjacent transducers 42 depending upon the desired frequency, the degree of focusing in the circumferential direction and the amount of energy needed to overcome attenuation by the medium inside the casing 24. When array 32 is formed of many individual transducers 32 each beam 42 is preferably produced by simultaneous or phased actuation of several transducers 32 for increased energy. A group of such transducers may thus be sequentially energized in increments of one transducer at a time.

FIG. 4 illustrates one example for a network used to operate the transducers 34. A clock 70 generates pulses at regular intervals to a ring counter 72 having a number of stages equal to the number of transducers 34. A decode network 74 identifies the state of the ring counter 72 and provides on output lines 76, signals representative of the transducer 34 to be actuated. This arrangement enables the selection of a number of transducers 34 for actuation at the same time, or nearly the same time, but where the transducers 34 that are so actuated are circumferentially spaced from each other. The circumferential spacing may, for example, be at ninety degree intervals or at such other angular interval selected to avoid interference between angularly spaced simultaneously active transducers 34.

The signals on lines 76 enable logic amplifiers 78.1-78.36 to which the output 80 of a transmitter 82 is connected, so that the transmitter signal on line 80 can be passed through to transducers 34.

In the receive mode the lines to transducers 34 are applied to logic amplifiers 84.1-84.36 which are enabled by pulses on lines 86.1-86.36 activated after suitable delays by pulses on lines 88.1-88.36 from pulse generators 90.1-90.36. The latter may thus serve to protect amplifiers 84.1-84.36 against the large voltages used to energize transducers 34.

The received reflection signals are applied to a frequency measuring device 92. This produces a signal representative of the frequency of the reverberations in the received reflection signal and thus represents a measurement of the thickness of the casing at the wall segment from where the acoustic reflection arose. The frequency measurement for the segments are applied to a frequency adjust network 94 with which the frequency of the transmitter signal source 82 is made equal to the measured value.

A measurement of the frequency of a received reflection from a segment and the subsequent adjustment of the transmitter frequency for a subsequent thickness measurement of a particular segment are separated by a substantial interval. Hence, the frequency measurements are temporarily stored in network 92 and replaced with new measurements as the associated transducer needs to be activated again.

The received reflection signals are shown applied through amplifiers such as 96 to an analog to digital converter 98 and then applied to signal processor 28 together with appropriate time and depth signals on lines 100, 102.

Figure 6:
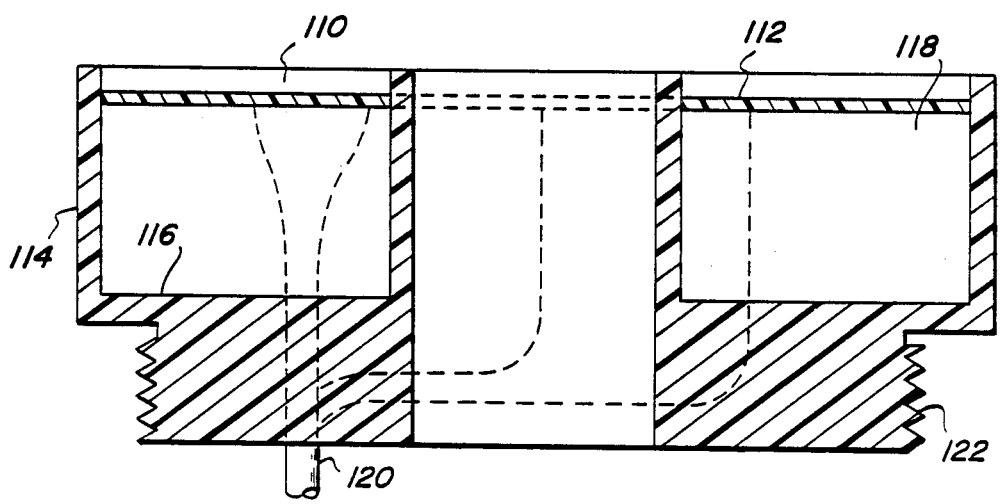
FIG. 6 is a section view of the transducer array of FIG. 5 taken along the line 6—6 therein.

Transducer array 32 is more particularly illustrated in FIGS. 5 and 6. The outer surface 36 is an annular layer 110 of a material that preferably is approximately a quarter of an acoustic wavelength in thickness. The transducer element may be formed on electro-acoustic material such as a piezo-electric material, and each element is cut from the same transducer material layer 112. The layer 112 is placed within a housing 114 which is also annular in shape and is made of an appropriate acoustic impedance material, such as epoxy, to reduce internal reflections. The transducers 34 are formed by making radial cuts 120 in the layer 112.

Housing 114 has a cavity 116 in which a common damping material 118 is placed behind the active layer 112 to achieve a high signal-to-noise ratio for the detection of acoustic reflections. The damping material may have a thickness selected to achieve a sufficient signal to noise ratio with a thickness of about one and a half inches thus achieving a substantial signal to noise ratio of the order of 60 db. The commonality of the ceramic material of which the transducers 34 are made and the same backing layer 118 provides a close matching between transducers 34 so that these vary in the same way with temperature and pressure. A transducer disk assembly as shown may have an outside diameter of about three inches and an internal diameter dimension of about one inch to thus be able to acoustically investigate casings of many different diameters. An electric cable 120 is shown connected to the individual transducers 34. The housing 114 has a threaded end section 122 for mounting to tool 20. When transducers 34.1-34.36 are made of a single ceramic crystal the response of each transducer 34 is closely matched to the other.

The size of a transducer is selected in consideration of the operating ultrasonic frequency. Preferably, the average width, w, is of the order of about a half wavelength. For a frequency of about 400 KH$_z$ the average width is about 0.1 to 0.2 inches (2.5 to 5 mm). The radial length of the transducers is such as to produce a more focused beam that after reflection from conical surface 40 is flattened in the vertical direction as suggested by FIG. 2A.

The number of transducers employed to form any one pulsed beam can be varied. However, if there are too many, the beam 42 tends to be too narrow in the circumferential direction and the detection of a reflection becomes too sensitive to eccentric tool positions. However, a sufficient number of transducers should be used to provide a sufficient intensity to detect the reflection.

Figure 7:
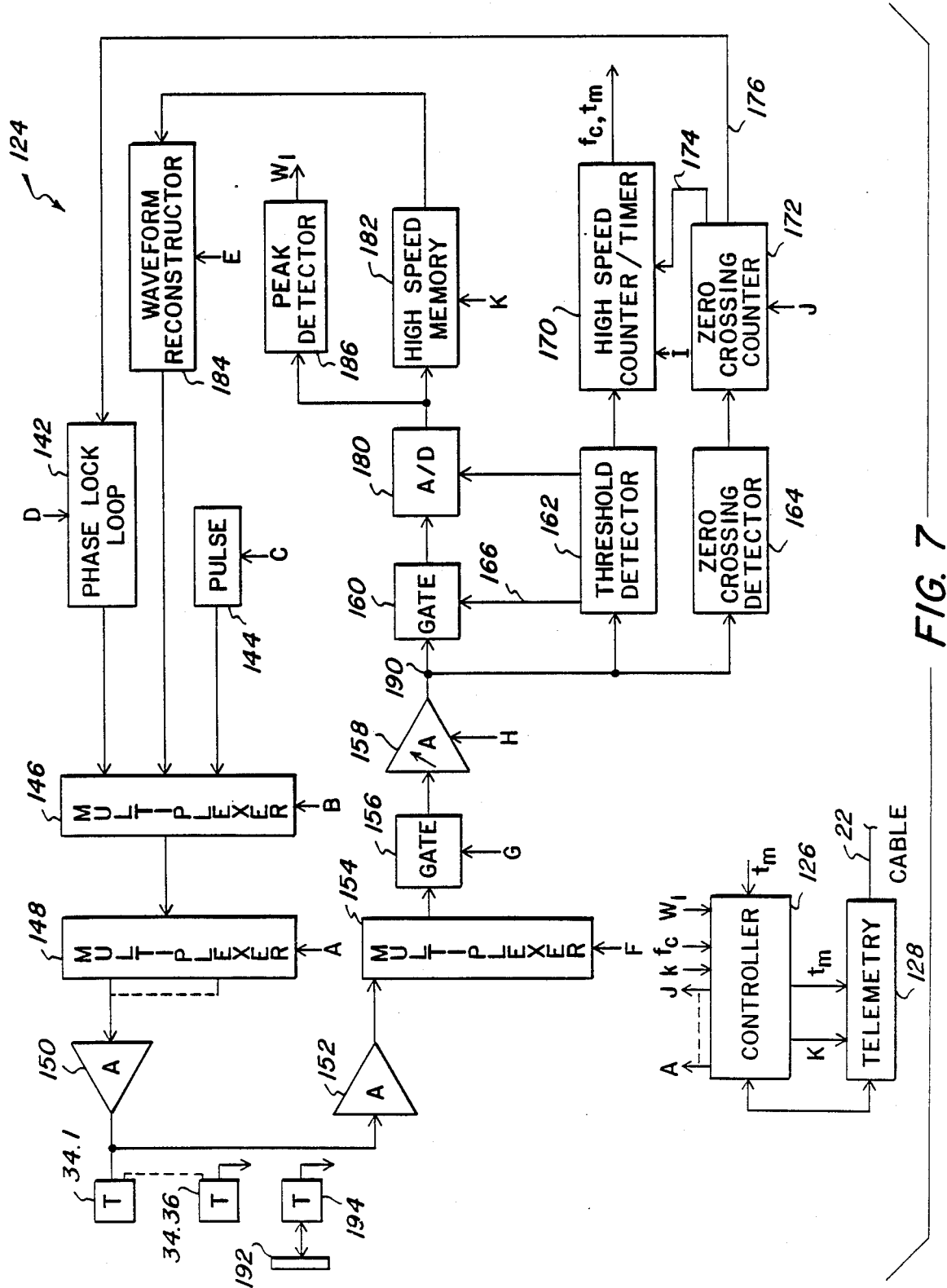
FIG. 7 is a block diagram of a circuit for operating the transducer array of FIG. 6.

FIG. 7 illustrates another apparatus 124 to measure the thickness of casing 24. The apparatus includes a controller 126 which bidirectionally communicates with surface located equipment through a telemetry link 128 and provides appropriate control signals for the various subsystems.

Figure 8:
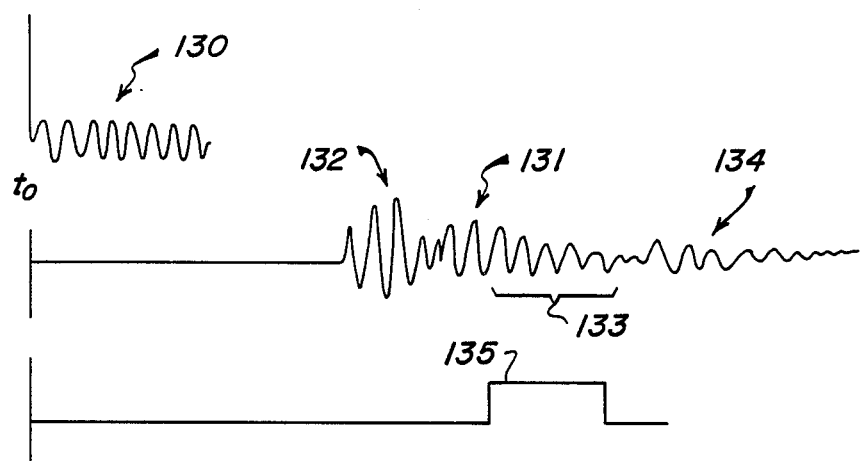
FIG. 8 is a waveform diagram of signals generated and detected by a transducer in an apparatus of this invention.

In the operation of a system of FIG. 7 and as illustrated in FIG. 8, an initial broad frequency band pulse 130 is transmitted at time $t_o$. The center frequency of this pulse is selected to be near the nominal natural resonance frequency of the casing 24. The received pulse 131 includes a portion 132 representative of the original transmitted pulse, a casing reverberation 133 and a formation reflection 134. The reverberations 133 are extracted by selection pulse 135. The casing reverberations will have a frequency component that is quite near the natural resonance of casing 24. However, this reverberation frequency and the natural frequency of the casing are initially not in exact agreement. This difference can be of the order of five percent and thus render the thickness measurement initially in error.

The casing, however, can be made to resonate at the natural frequency by applying several pulses such as 130, but each being made with a frequency content present in the reverberations from a previous pulse 130. Accordingly, the output of an adjustable frequency generator is set to the frequency of the reverberations or a portion of the latter itself is used to fire a transducer 34.

This process is repeated until the pulse 130 and the frequency measured for the reverberations are the same within a predetermined allowable error. For an accuracy of about 0.5% in determining the natural resonance frequency of the casing about three iterations are usually sufficient. In this manner, significant casing thickness variations from a nominal value and of the order of 30% can be reliably identified.

The frequency for the operation of transducers 34 may be initially set with a phase lock loop 142 the frequency of which is controlled from up-hole commands or by firing the transducers 34 initially with a broadband pulse from a pulse generator 144. If the natural resonance is far from the nominal value a variable frequency generator can be used and swept through the frequency range of interest until an observable resonance is determined.

The frequency signal is passed through a multiplexer 146 to the transducer multiplexer 148 and then amplified by amplifier 150. The received signal is amplified by amplifier 152 and passed through multiplexer 154. The latter's output passes through a gate 156 which is set so that extraneous signals are not detected. The output of gate 156 is applied to a gain controlled amplifier 158.

The output of amplifier 158 is applied to a gate 160, a threshold detector 162 and a zero crossing detector 164. The threshold detector 162 is used to determine arrival of a received signal and then enable gate 160 by applying an enabling signal on line 166. Threshold detector 162 is further used to initiate high speed controls for measuring borehole mud transit time and the time associated with several periods of the reverberations in the received signal. The output of threshold detector 162 is, therefore, applied to initialize a high speed counter and timer 170.

The zero crossing detector 164 and a zero crossing counter 172 are used to determine the number of cycles in the reverberation signal of the detected acoustic reflection. The frequency is the ratio of the number of cycles divided by the time which is obtained by applying one output 174 of zero crossing counter 172 to the counter/timer 170.

The zero crossing counter 172 also has an output 176 that represents the frequency of the reverberations as determined by zero crossing detector 164. This output 176 is applied to phase lock loop 142.

An alternate frequency control employs an analog to digital converter 180 whose output is applied to a high speed memory 182. The latter's output is applied to a waveform reconstructor 184 which generates drive signals for transducers 34. A peak value of the received signals is detected by peak detector 186 and its output is used to set the gain for amplifier 158. This gain is so controlled that the signal level at junction 190 remains constant.

Controller 126 performs a number of functions such as controlling the frequency measurement for each transducer 34 and storing gain control levels associated with respective frequency measurements. Controller 126 provides appropriate signals to the various described networks in the system and formats data for transmission as well as establishes communication with surface located equipment.

Controller 126 initiates periodic acoustic thickness measurements of a steel plate 192 by a transducer 194 of similar design as transducers 34. Plate 192 is mounted to tool 20 in a manner so as to expose the plate to the medium and ambient conditions inside the borhole 25. The plate 192 has a known thickness so that measurements of its thickness at regular depth intervals enables monitoring variations attributable to both pressure and temperature. In this manner, the measurements of casing thickness can be adjusted for pressure and temperature and a more precise measurement of casing thickness is obtained.

Having thus described several embodiments in accordance with the invention its advantages can be appreciated. A high accuracy in the thickness measurement can be achieved without complex signal processing. A complete measurement of the thickness of a casing wall segment 46 can be made in about a millisecond. A casing thickness measuring technique in accordance with the invention is relatively insensitive to transducer bandwidth, near/far acoustic field effects and eccentered positions of tool 20 inside the casing 24. With the use of narrow frequency bandwidth pulses, the duration of reverberations will be long even when the bond of the cement 25 behind the casing wall segment that is being investigated is good; thus enabling a more precise determination of the casing natural resonance frequency. Corrosion problems can be timely diagnosed by making regular acoustic investigations.

What is claimed is:

1. An apparatus for investigating a borehole having a borehole wall with a casing having a casing wall penetrating an earth formation comprising:
   a tool shaped to move along the borehole, said tool having an axis which is generally parallel to the wall of the borehole;
   a substantially continuous array of acoustic transducers concentrically mounted on the tool around the tool axis, said array being oriented to transmit and then detect acoustic energy traveling along a path generally parallel to the tool axis;
   a substantially radially continuous acoustic reflection surface which is generally concentric with the tool axis and is axially spaced from the array and is interposed in the path of acoustic energy transmitted from and to be detected by the array;
   means for selectively actuating the transducers in the array to produce circumferentially discrete pulsed beams of acoustic energy from the array with the beams distributed around the tool axis and being directed onto the reflection surface;
   said reflection surface being inclined at such angle relative to the tool axis so as to reflect transmitted beams primarily onto discrete circumferential casing segments of the casing wall with an angle of incidence that is substantially normal to the casing wall and with a circumferentially curved acoustic wavefront;
   the acoustic transducers that are energized to produce said pulsed beams being of a number so selected that the casing segments onto which the beams are incident circumferentially overlap; and
   means for deriving from acoustic energy detected by the transducers an indication of a characteristic of the casing wall at said casing segments.

2. The apparatus as claimed in claim 1 wherein said casing wall has a nominal resonance and said transducer actuating means comprises:
   means for initially energizing selected transducers with a frequency bandwidth pulse that includes frequencies at the nominal resonance of the casing wall,
   means for determining the frequency in an acoustic return which is representative of acoustic reverberations produced in the casing wall from the initial energization of the selected transducers,
   means for reenergizing the selected transducers with a pulse of frequencies at the determined frequency, and
   means for determining the frequency in the acoustic return which is representative of acoustic reverberations produced in the casing wall from the reenergization of the selected transducers.

3. The apparatus as claimed in claim 1 wherein the array of acoustic transducers has a circular active disk-shaped surface which is oriented generally transverse to the bore axis, and wherein the active disk-shaped surface is separated into discrete adjacently located and annularly distributed transducers.

4. The apparatus as claimed in claim 3 wherein the acoustic transducers are formed from a common electroacoustic material layer.

5. The apparatus as claimed in claim 4 wherein the acoustic transducers include a common backup material with a thickness selected for a sufficient signal to noise ratio.

6. The apparatus as claimed in claim 1 wherein the average circumferential width of the acoustic transducers is of the order of about a half wavelength of the central frequency of actuation of the transducers and the radial dimension of the transducers is substantially greater than said wavelength.

7. The apparatus as claimed in claim 6 wherein the average circumferential width of said transducers is in the range from about 2.5 mm to about 5 mm.

8. A method for acoustically investigating a wall of a casing in a borehole penetrating an earth formation with a tool moved along the borehole, said casing wall having a circumference, the method comprising the steps of:
   generating from different acoustic sources circumferentially separate non-interfering pulsed beams of acoustic energy in a direction that is generally parallel to the axis of the tool,
   reflecting the beams towards the wall of the casing so as to be incident upon respective casing wall segments,
   said separate beams being so circumferentially spaced as to provide a circumferential overlap of casing wall segments upon which the beams are incident to investigate the casing wall along its entire circumference, and
   detecting acoustic energy which is reflected from the wall segments.

9. The method as claimed in claim 8 wherein the generating step further comprises:
   generating a plurality of circumferentially spaced and isolated beams of acoustic energy at generally the same time.

10. The method as claimed in claim 8 and further including the step of:
    measuring the frequency of the portion of the detected acoustic energy attributable to acoustic reverberations inside the casing wall segments.

11. The method as claimed in claim 10 and further including the steps of:
    generating circumferentially separate pulsed beams of acoustic energy at a frequency corresponding to that as previously measured for respective casing wall segments and directing these latter pulsed beams at respective casing wall segments to which said previous frequency measurements relate, and
    measuring the frequency of the portion of the acoustic energy attributable to acoustic reflections caused by the latter pulsed beams and attributable to reverberations in respective casing wall segments.

* * * * *